United States Patent
Hoffman et al.

(10) Patent No.: US 6,397,198 B1
(45) Date of Patent: May 28, 2002

(54) TOKENLESS BIOMETRIC ELECTRONIC TRANSACTIONS USING AN AUDIO SIGNATURE TO IDENTIFY THE TRANSACTION PROCESSOR

(75) Inventors: Ned Hoffman, Sebastopol; David Ferrin Pare, Jr., Berkeley; Jonathan Alexander Lee, Oakland, all of CA (US); Philip Dean Lapsley, Newton, MA (US)

(73) Assignee: Indivos Corporation, Oakland, CA (US)

( * ) Notice: Subject to any disclaimer, the term of this patent is extended or adjusted under 35 U.S.C. 154(b) by 0 days.

(21) Appl. No.: 09/357,718

(22) Filed: Jul. 20, 1999

Related U.S. Application Data

(63) Continuation-in-part of application No. 09/239,570, filed on Jan. 29, 1999, which is a continuation-in-part of application No. 08/705,399, filed on Aug. 29, 1996, now Pat. No. 5,870,723, which is a continuation-in-part of application No. 08/442,895, filed on May 17, 1995, now Pat. No. 5,613,012, which is a continuation-in-part of application No. 08/345,523, filed on Nov. 28, 1994, now Pat. No. 5,615,277.

(51) Int. Cl.[7] .............................................. G06F 17/60
(52) U.S. Cl. ............................ 705/44; 705/18; 705/39; 705/44; 705/67; 705/64
(58) Field of Search ............................. 705/44, 64, 65, 705/67, 75, 76, 18, 39, 43; 382/115

(56) References Cited

U.S. PATENT DOCUMENTS

| | | | | |
|---|---|---|---|---|
| 3,876,864 A | * | 4/1975 | Clark et al. ................. | 235/379 |
| 3,943,335 A | * | 3/1976 | Kinker et al. ............... | 235/379 |
| 4,321,672 A | | 3/1982 | Braun ......................... | 364/408 |
| 4,390,968 A | | 6/1983 | Hennessy .................... | 364/900 |
| 4,484,328 A | | 11/1984 | Schlafly ..................... | 370/394 |
| 4,675,815 A | | 6/1987 | Kuroki ....................... | 364/900 |
| 4,734,858 A | | 3/1988 | Schlafly ..................... | 705/26 |

(List continued on next page.)

FOREIGN PATENT DOCUMENTS

| | | |
|---|---|---|
| EP | 0581421 A1 | 2/1994 |
| EP | 0651357 A1 | 3/1995 |
| WO | WO/95/13591 | 5/1995 |
| WO | WO/98/25227 | 6/1998 |

OTHER PUBLICATIONS

Lange, Larry et al, "Digital Identification: It's Now at our Fingertips", Electronic Engineering Times, No. 946, Mar. 24, 1997.*

(List continued on next page.)

*Primary Examiner*—James P. Trammell
*Assistant Examiner*—Joan W. Hayes
(74) *Attorney, Agent, or Firm*—Ali Kamarei

(57) ABSTRACT

The invention discloses a tokenless biometric identification computer system, comprising at least a database containing registered biometric samples of users. A comparator compares a bid biometric sample of a user to at least one registered biometric sample, the bid biometric sample obtained directly from the user during an identification process for conducting an electronic transaction by the user. A stored audio signature is associated with a transaction processor entity, which the transaction processor entity is responsible for conducting the electronic transaction. A sound generator generates an analog or digital signal from the stored audio signature, and a transducer converts the analog or digital signal to a play back audio signature. This invention generates a play back audio signature from the stored audio signature that is associated with the transaction processor entity and the play back audio signature is played back to the user to identify the transaction processor entity that conducted the electronic transaction, wherein no man made personal devices such as credit cards, identity cards or the like is used during the identification process for conducting the electronic transaction.

16 Claims, 5 Drawing Sheets

U.S. PATENT DOCUMENTS

| | | | |
|---|---|---|---|
| 4,799,156 A | | 1/1989 | Shavit ........................ 364/401 |
| 4,821,118 A | | 4/1989 | Lafreniere .................. 358/108 |
| 4,837,422 A | | 6/1989 | Dethloff et al. ............. 364/408 |
| 4,845,636 A | * | 7/1989 | Walker ........................ 705/39 |
| 4,926,480 A | | 5/1990 | Chaum ........................ 380/23 |
| 4,947,028 A | | 8/1990 | Gorog ........................ 235/380 |
| 4,961,142 A | | 10/1990 | Elliott et al. ................ 364/408 |
| 4,993,068 A | | 2/1991 | Piosenka et al. .............. 380/23 |
| 4,995,086 A | | 2/1991 | Lilley et al. .................... 382/4 |
| 4,998,279 A | | 3/1991 | Weiss ........................ 340/825 |
| 5,036,461 A | | 7/1991 | Elliot et al. ................. 364/408 |
| 5,054,089 A | | 10/1991 | Uchida et al. ................. 382/4 |
| 5,095,194 A | | 3/1992 | Barbanell .................... 235/380 |
| 5,109,427 A | | 4/1992 | Yang ............................. 382/4 |
| 5,109,428 A | | 4/1992 | Igaki et al. ..................... 382/5 |
| 5,144,680 A | | 9/1992 | Kobayashi .................. 250/556 |
| 5,168,520 A | | 12/1992 | Weiss ........................... 380/23 |
| 5,180,901 A | | 1/1993 | Hiramatsu .................. 235/380 |
| 5,191,611 A | | 3/1993 | Lang ........................... 380/25 |
| 5,210,588 A | | 5/1993 | Lee ............................. 356/71 |
| 5,210,797 A | | 5/1993 | Usui et al. ...................... 382/4 |
| 5,222,152 A | | 6/1993 | Fishbine et al. ................ 382/2 |
| 5,224,164 A | | 6/1993 | Eisner et al. ................. 380/44 |
| 5,229,764 A | | 7/1993 | Matchett et al. ....... 340/825.34 |
| 5,230,025 A | | 7/1993 | Fishnine et al. ............... 382/4 |
| 5,239,583 A | | 8/1993 | Parrillo ........................ 380/23 |
| 5,241,606 A | | 8/1993 | Horie ............................. 382/4 |
| 5,251,259 A | | 10/1993 | Mosley ........................ 380/23 |
| 5,265,162 A | | 11/1993 | Bush et al. .................... 380/24 |
| 5,276,314 A | | 1/1994 | Martino et al. ............. 235/380 |
| 5,280,527 A | | 1/1994 | Gullman et al. .............. 380/23 |
| 5,321,242 A | | 6/1994 | Heath, Jr. ................... 235/382 |
| 5,325,442 A | | 6/1994 | Knapp ........................... 382/4 |
| 5,329,589 A | | 7/1994 | Fraser et al. ................. 379/91 |
| 5,335,288 A | | 8/1994 | Faulkner ........................ 381/2 |
| 5,343,529 A | | 8/1994 | Goldfine et al. .............. 380/23 |
| 5,351,303 A | | 9/1994 | Willmore ....................... 382/4 |
| 5,354,974 A | | 10/1994 | Eisenberg ................... 235/379 |
| 5,359,669 A | | 10/1994 | Shanely et al. ............. 382/117 |
| 5,383,113 A | | 1/1995 | Kight et al. ................... 705/40 |
| 5,386,104 A | | 1/1995 | Sime .......................... 235/379 |
| 5,499,288 A | | 3/1996 | Hunt ........................... 379/266 |
| 5,513,272 A | | 4/1996 | Bogosian, Jr. .............. 382/136 |
| 5,517,558 A | | 5/1996 | Schalk .......................... 379/88 |
| 5,561,718 A | | 10/1996 | Muller ........................ 379/266 |
| 5,602,933 A | * | 2/1997 | Blackwell et al. ........... 382/116 |
| 5,604,802 A | | 2/1997 | Holloway ...................... 380/24 |
| 5,613,102 A | | 3/1997 | Hoffman et al. ............. 382/115 |
| 5,615,277 A | | 3/1997 | Hoffman ..................... 382/115 |
| 5,636,282 A | | 6/1997 | Holmquist .................... 380/25 |
| 5,745,555 A | | 4/1998 | Mark ........................... 379/95 |
| 5,757,917 A | | 5/1998 | Rose et al. | 
| 5,764,789 A | | 6/1998 | Pare, Jr. et al. ............. 382/115 |
| 5,802,199 A | | 9/1998 | Pare, Jr. et al. ............. 382/115 |
| 5,805,719 A | | 9/1998 | Pare, Jr. et al. ............. 382/115 |
| 5,826,245 A | | 10/1998 | Sandberg-Diment ......... 705/44 |
| 5,838,812 A | | 11/1998 | Pare, Jr. et al. ............... 705/44 |
| 5,870,723 A | | 2/1999 | Pare, Jr. et al. ............... 705/39 |
| 5,956,700 A | | 9/1999 | Landry ......................... 705/40 |
| 5,991,372 A | | 11/1999 | Davenport D'Ingianni et al. |
| 6,016,476 A | | 1/2000 | Maes et al. ..................... 705/1 |
| 6,023,688 A | | 2/2000 | Ramachandran et al. |
| 6,045,039 A | * | 4/2000 | Stinson et al. .............. 235/379 |
| 6,084,967 A | | 7/2000 | Kennedy et al. ............ 380/247 |

OTHER PUBLICATIONS

Anderson et al., Security Management, American Society for Industrial Security V.37, n11, 17–19 (Nov. 1993).

Anonymous, A Credit Union Points a Finger at Biometrics, Bank Network News, v 15 n16, Jan. 13, 1997.

Hall, J., Scanning Lets Fingerprints Do Talking, Toronto Star, PA6, May 15, 1997.

Scally, R., CompUSA Tests Fingerprints to Help Secure Transactions, Discount Store News v36 n10, May 19, 1997.

* cited by examiner

Transaction Request Message 19

Transaction Response Message 20

TOKENLESS BIOMETRIC ELECTRONIC TRANSACTIONS USING AN AUDIO SIGNATURE TO IDENTIFY THE TRANSACTION PROCESSOR

CROSS-REFERENCE

This application is a continuation-in-part of application Ser. No. 09/239,570, filed Jan. 29, 1999, which is a continuation-in-part of U.S. application Ser. No. 08/705,399 filed on Aug. 29, 1996 now U.S. Pat. No. 5,870,723, which is a continuation-in-part of U.S. application Ser. No. 08/442,895 filed on May 17, 1995 now U.S. Pat. No. 5,613,012, which is a continuation-in-part of U.S. application Ser. No. 08/345,523, filed on Nov. 28, 1994, now U.S. Pat. No. 5,615,277, which patents are all incorporated herein by reference.

BACKGROUND

This invention relates to the field of tokenless biometric financial and rewards transactions. Specifically, this invention is directed towards a system and method of producing an audio wave or sound to inform a system user of the identity of the party that has processed an electronic transaction for the user.

The use of a token, an inanimate object which confers a capability to the buyer presenting it, is pervasive in today's electronic financial or consumer rewards systems. Whether a consumer is buying groceries with a debit card, shopping in a department store with a credit card or earning free frequent flyer miles over the internet, at the heart of that transaction is an electronic transfer of funds or benefits enabled by a token, which acts to identify both the consumer as well as the financial account being accessed.

Traditionally, a person must possess a man-made personalized token to gain access or authorization for an electronic financial or rewards transaction. Tokens such as magnetic ink encoded paper checks, smart cards, magnetic swipe cards, identification cards or even a personal computer programmed with resident user-specific account data, are "personalized" because they are each programmed or encoded with data that is unique and personalized to the authorized user. For example: at a retail point of sale, the user directly possesses and physically presents personalized credit, debit or rewards cards imprinted with text and graphics identifying the merchant or the transaction processor entity institution, along with having a magnetic stripe encoded with his unique account data to the merchant; or, over the internet, the user directly possesses and electronically presents his personal computer's resident user-unique account data to the remote merchant, while the computer's screen presents text or graphical displays identifying the merchant or transaction processor entity institution. By contrast, as the disclosed invention is completely tokenless, the user does not directly possess, carry or remember any personalized token that can be lost, stolen or damaged.

Therefore, the key function of such tokens is to identify both the user and the financial account being accessed to pay for the transaction, while textually or graphically notifying to the consumer which merchant or banking account they are accessing. While the biometric component of a tokenless transaction accomplishes the former, this invention creates a solution for tokenless transaction to also accomplishing the latter. Specifically, since there is no card or physical object on which to imprint the name or the graphical logo of the transaction processor entity institution, this invention uses an audio signature to identify the authentic transaction processor to the user.

Various token-based biometric technologies have been suggested which use smart cards, magnetic swipe cards, or paper checks in conjunction with fingerprints, hand prints, voice prints, retinal images, facial scans or handwriting samples. These biometrics are generally either: a) stored in electronic and reproducible form on the token itself and the verification process is not isolated from the hardware and software directly used by the user attempting access, or; b) used in tandem with the user directly using magnetic swipe cards, paper checks or a PC with the user's financial data stored resident therein. Examples are described in U.S. Pat. No. 4,821,118 to Lafreniere; U.S. Pat. No. 4,993,068 to Piosenka et al.; U.S. Pat. No. 4,995,086 to Lilley et al.; U.S. Pat. No. 5,054,089 to Uchida et al.; U.S. Pat. No. 5,095,194 to Barbanell; 5,109,427 to Yang; U.S. Pat. No. 5,109,428 to Igaki et al.; U.S. Pat. No. 5,144,680 to Kobayashi et al.; U.S. Pat. No. 5,146,102 to Higuchi et al.; U.S. Pat. No. 5,180,901 to Hiramatsu; U.S. Pat. No. 5,210,588 to Lee; U.S. Pat. No. 5,210,797 to Usui et al.; U.S. Pat. No. 5,222,152 to Fishbine et al.; U.S. Pat. No. 5,230,025 to Fishbine et al.; U.S. Pat. No. 5,241,606 to Horie; U.S. Pat. No. 5,265,162 to Bush et al.; U.S. Pat. No. 5,321,242 to Heath, Jr.; U.S. Pat. No. 5,325,442 to Knapp; U.S. Pat. No. 5,351,303 to Willmore.

A tokenless biometric identification system requires no cards or tokens, which present the identity of the transaction processor. Furthermore, various transaction processors from different entities may conduct various phases of an electronic transactions, therefore, there is a need for an electronic financial and rewards transaction system that provides an audio signature associated with the transaction processor to notify and authenticate to the user the identity of the party that has processed the user's transaction, while not requiring the user to present any personalized man-made memory tokens such as smart cards, magnetic swipe cards, encoded paper checks or personal computers for identification.

SUMMARY

The invention discloses a tokenless biometric identification computer system comprising at least a database containing registered biometric samples of users. A comparator compares a bid biometric sample of a user to at least one registered biometric sample wherein the bid biometric sample is obtained directly from the user during an identification process for conducting an electronic transaction by the user. An audio signature is associated with a transaction processor entity and is stored in the computer system, where the transaction processor entity is responsible for conducting the electronic transaction. A sound generator generates an analog or digital signal from the stored audio signature, and a transducer converts the analog or digital signal to a play back audio signature. This invention generates a play back audio signature from the stored audio signature that is associated with the transaction processor entity and the play back audio signature is played back to the user to identify the transaction processor entity that conducted the electronic transaction. This system operates without any man made personal devices such as credit cards, identity cards or the like is used during the identification process for conducting the electronic transaction.

The identification computer system optionally comprises a stored audio signature data bank, wherein the audio signature databank contains at least two stored audio signatures. Each audio signature is preferably associated with a transaction processor entity. Optionally, the identification computer system has two or more stored audio signatures that are associated with a transaction processor entity. Furthermore, the identification computer system has at least two transaction processor entities. The play back audio signature is preferably in the form of an audio sound wave comprising of the group of a tone, a musical fragment, speech, phonation, or a song that is designed or meant to identify the transaction processor entity.

The method of identification of a transaction processor entity to a user of a tokenless biometric identification computer system, comprises of the following steps. The system obtains a bid biometric sample from the user's person and comparing the bid biometric sample to registered biometric samples to produce a successful or failed identification of the user. A stored audio signature associated with a transaction processor entity is registered with the identification computer system. An analog or digital signal from the stored audio signature is generated and converted to a play back audio signature. The play back audio signature converted from the audio signature associated with the transaction processor entity is played back to the user to identify the transaction processor that conducted the electronic transaction, wherein no man made personal devices such as credit cards, identity cards or the like are used during the identification process for conducting the electronic transaction.

The method of the invention further comprises an audio data bank containing at least two audio signatures, where each audio signature is associated with a different transaction processor entity. Optionally, a stored audio signature data bank contains at least two stored audio signatures, each audio signature associated with a transaction processor entity. Additionally, two or more stored audio signatures is associated with a transaction processor entity. It is understood that more than one transaction processor entity may be identified by the system. Optionally, at least two transaction processors are identified to the user of the computer system by playing back the audio signature associated with each transaction processor entity.

Further objects and advantages will become apparent from a consideration of the drawings and ensuing description.

DETAILED DESCRIPTION

Figure 1:
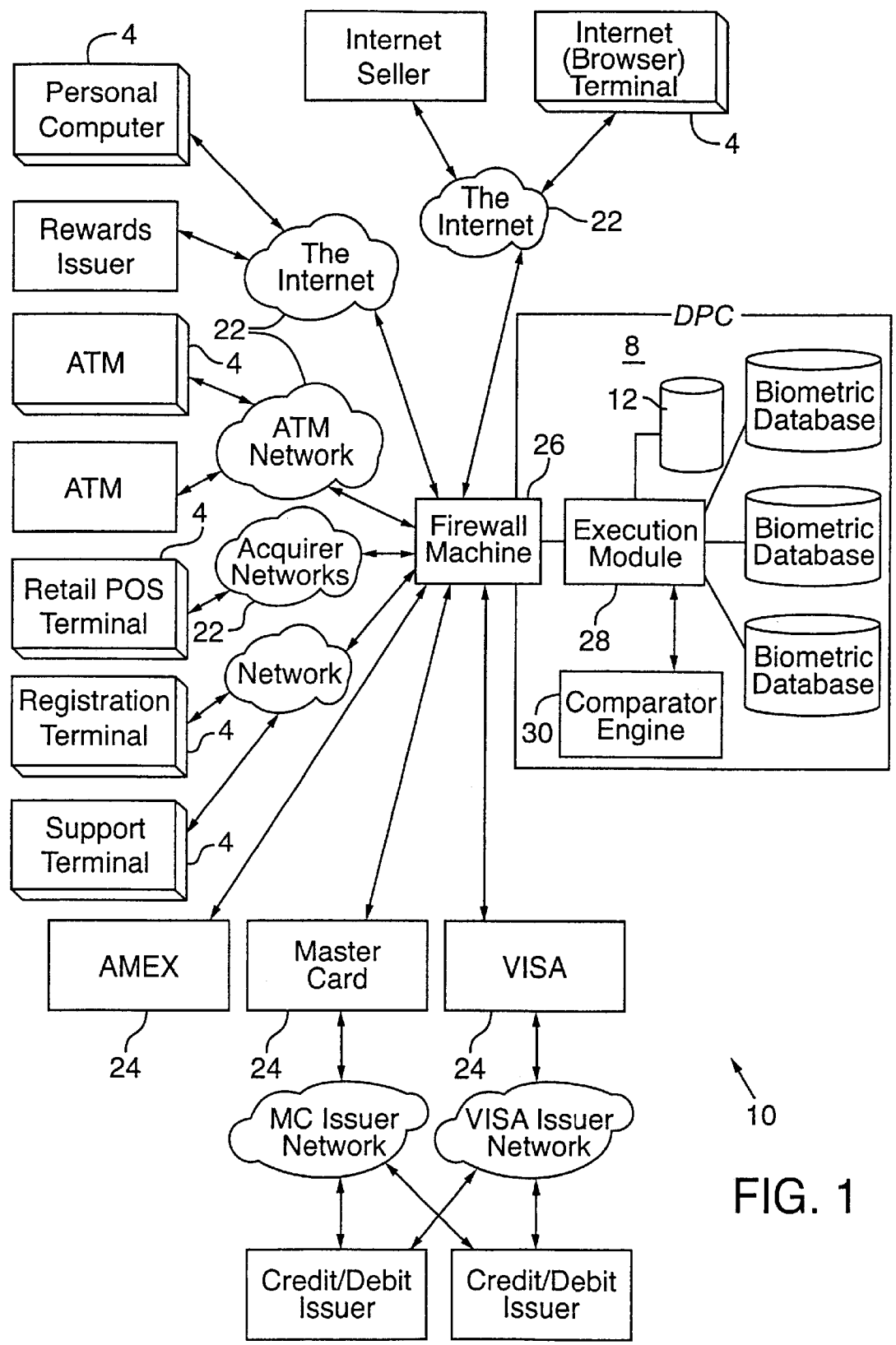
FIG. 1 shows the overall embodiment of the invention where the user submits biometric information to the computer identification system and played backs an audio signature that is associated with the transaction processor.
Figure 2:
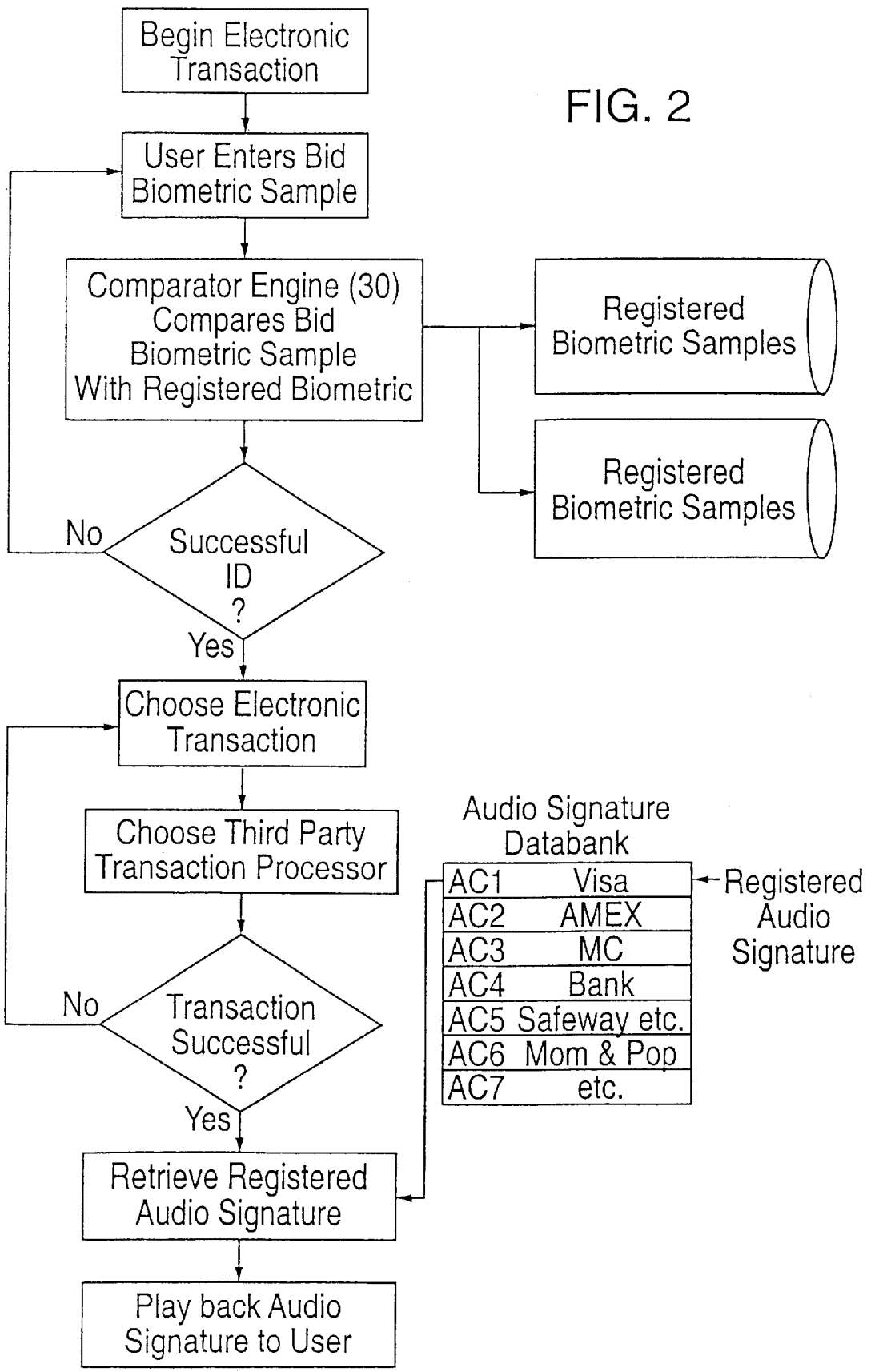
FIG. 2 is a flow chart of an alternative embodiment of the invention, where the third party audio data bank resides in the identification computer system data processing center.
Figure 3:
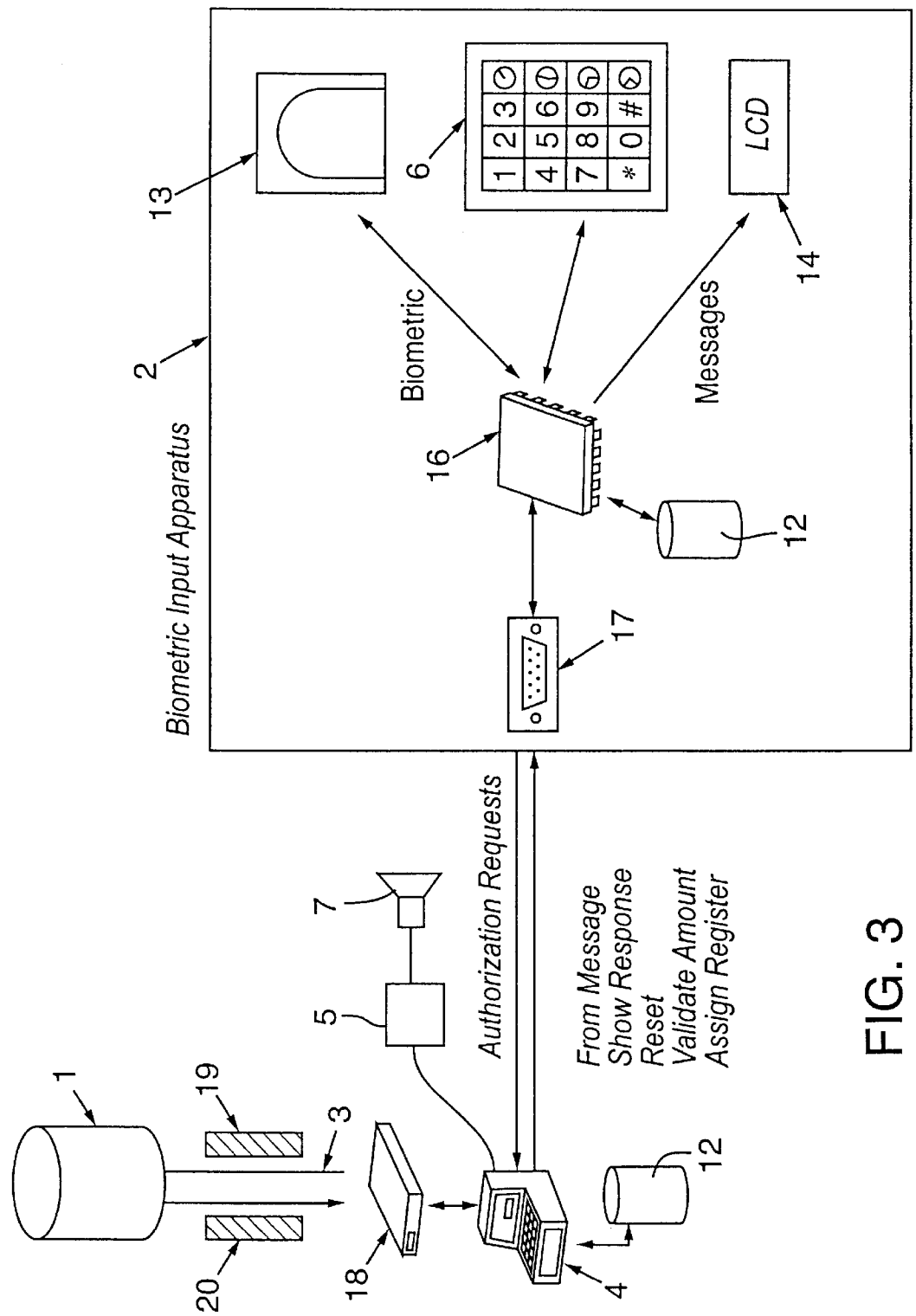
FIG. 3 shows an embodiment of a biometric input apparatus.
Figure 4:
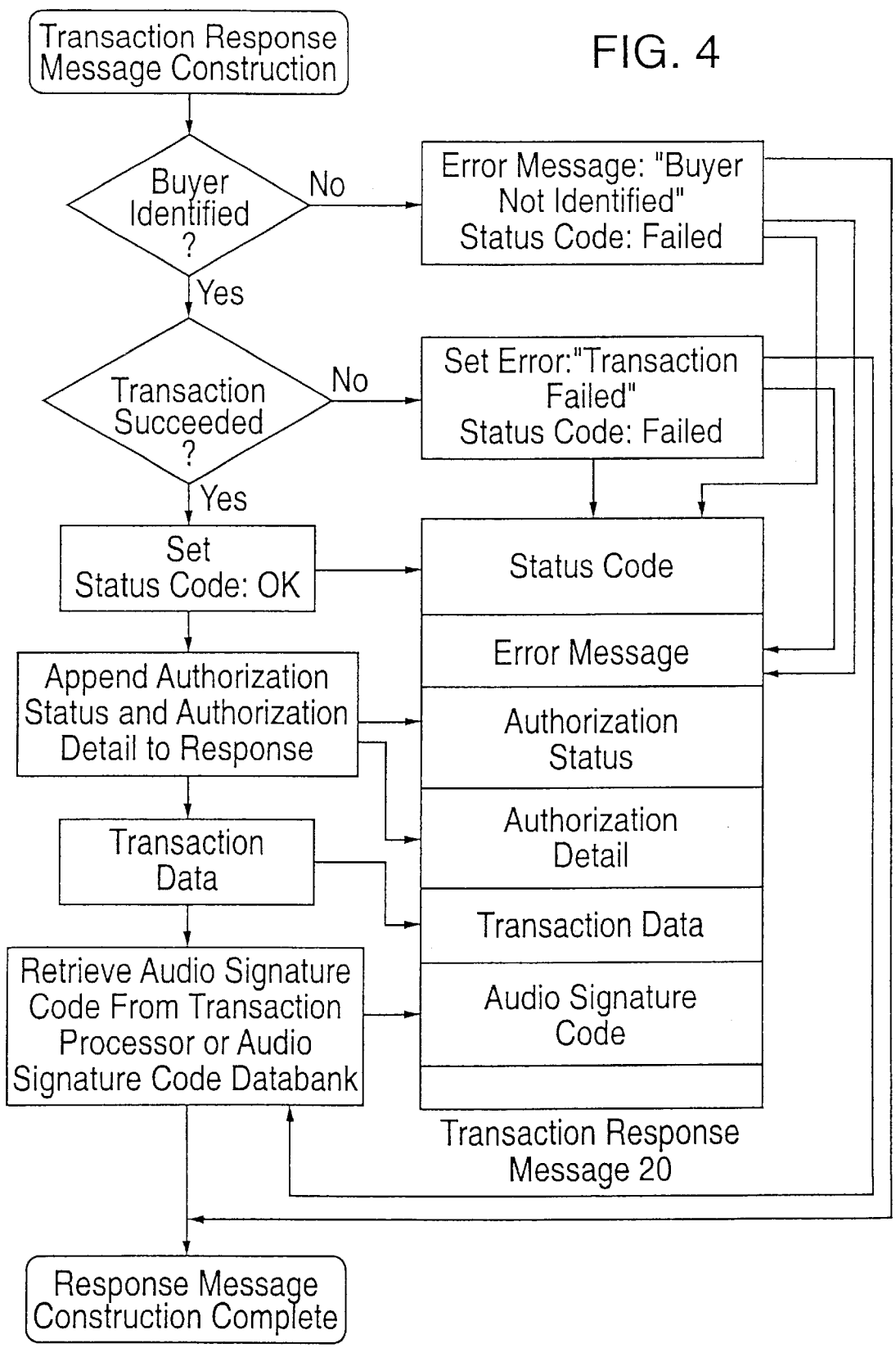
FIG. 4 shows the construction of an embodiment of construction of a Transaction Response Message.

The invention provides a user with a cardless biometric system and method for identification of a party that conducts an electronic transaction and identification of a transaction processor entity through an audio signature that is played back to the user. Examples of electronic transactions include, banking transactions using electronic credit or debit accounts, point of sale financial transactions, purchase of goods or services over the Internet, user identification process, or loyalty program transactions such as receiving coupons, frequent flyer miles, or free items, using a rewards account. It is the essence of this invention that the user is not required to directly use any man-made personalized tokens during the identification processes after the user has initially registered with the identification system.

An electronic credit account is defined as an account that allows authorization and settlement of electronic payments as issued by transaction processor entities such as VISA®, MasterCard®, Discover®, American Express®, or an in-house credit account issued by a retailer such as Macy's. These transaction processor entities lend money to users and charge interest on the money, often charge interchange fees to payees, and are responsible for approving or denying the financial transactions. Off-line debit accounts are also defined as credit accounts even though the funds are deposited by a user instead of a line of credit from a transaction processor entity.

An electronic debit account is defined as an account that holds money deposited by a user available for immediate debit in real time, also known in the industry as on-line debit. These are often checking accounts operated by transaction processor entities such as banks and credit unions. These transaction processor entities are responsible for approving or denying the debit financial transactions. On-line debit transactions require a PIN for identification of the user.

A rewards account is defined as an account that contains reward-units deposited by a rewards transaction processor entity. The rewards account is optionally managed by the rewards transaction processor entity, or by a third party such as an individual, a retail service provider, a retail product provider, that manages rewards accounts from various reward-units issuers. A rewards transaction is any electronic debiting or crediting of reward-units with respect to a recipient's or a user's rewards account.

The tokenless electronic transaction system or the identicator comprises the following components:
Terminal
Communication lines
Data Processing Center (DPC)
Audio Signatures that are associated with a transaction processor entity These components together allow a user to originate an electronic transaction without requiring the user to carry driver's licenses, credit cards, check guarantee cards, or other forms of identity.

Terminal

The terminal is a device that gathers identity information and other transaction data for use in authorizing electronic transactions. Transaction data includes any data that is necessary for the consummation of the electronic transaction including an audio signature code, transaction processor identification code, hardware identification code, price information, number of units of rewards, date, time, or other electronic instructions.

Each terminal conducts one or more of the following operations:
gathers biometric input from a user through a biometric input apparatus
gathers a PIN code or password from a user
the terminal and the DPC use encryption to store and retrieve a unique transaction processor audio signature and audio signature code
display information, allow parties to approve or cancel an electronic payment
scan a magnetic stripe card
store, retrieve, and play back a transaction processor audio signature identified by a transaction processor identification code that is associated with a transaction processor entity.

allow parties to an electronic transaction to select among a choice of transaction processors.

A preferred embodiment 10 containing these components is shown in FIG. 1.

Biometric input is gathered using a biometric input apparatus 2 which is optionally housed within terminal 4. Biometric input apparatus 2 is a finger image sensor, however it is understood that other types of biometric sensors such as an iris scan or facial scan and others are optionally used.

For systems employing a PIN, PIN input is preferably gathered using a keypad or PIN pad 6. Communication security is provided by well known encryption methods such as DES and public key encryption.

Additionally, in an embodiment, terminal 4 has memory unit 12 that stores registered audio signatures. Each registered audio signature is associated with an audio signature code, and each transaction processor audio signature code is associate with a transaction processor entity. Alternatively, memory unit 12 is located within biometric input apparatus 2. A sound generator 5 generates an analog or digital signal from the stored audio signature, and a transducer 7 converts the analog or digital signal to a play back audio signature.

Each terminal preferably has a unique hardware identification code that is registered with the DPC 8. This makes the terminal uniquely identifiable to the DPC in all transmissions from that terminal.

Information such as the amount of a transaction, the identity of a payee, the list of credit/debit accounts for a user to select from, or other transaction-related information is preferably displayed back to the user using an integrated LCD screen such as 14. It is preferable that the LCD screen be connected securely to the other components in the terminal to maintain security. Approval or cancellation of an electronic payment by a user is done using the terminal keypad 6.

During initial registration of a user, a magnetic stripe reader (not shown) is used to read the account information that is encoded on the magnetic stripe of the user's credit or debit card to expedite linking a user's credit/debit account or rewards account number to a registration biometric sample identity of the user and to reduce errors associated with entry of financial data and account numbers.

Optionally, the terminal 4 also validates public key digital certificates. In one embodiment, public keys of a particular certifying authority are initially stored in the terminal at the time of construction. This provides the mechanism to verify a payee's digital certificates that are signed by the certifying authority.

The terminal also optionally displays a list of the user's credit/debit financial accounts on the LCD screen and provides for selection of accounts using the keypad. Specific logos provided by each transaction processor entity is optionally displayed back in place of the account number, so that the user can select which electronic account will be used for conducting the electronic transaction.

Although a preferred embodiment is described above, there are many different variations on specific terminal implementations. Fundamentally any device that is secure, can identify a person or entity, and can connect to the DPC via some form of communication line can serve as a terminal.

Communication Lines

Communication between the terminal and the DPC occur via many different communication methods. Most depend on the particular communication networks already deployed by transaction processors 24 that are linked to the electronic transaction biometric authorization system.

In an embodiment shown in FIG. 1, terminals 4, DPC 8, and transaction processors 24, are connected to terminals through ATM networks, cable networks, or other such networks.

In yet another embodiment, a terminal is connected via the Internet, as is at least one DPC. TCP/IP is used to transmit messages from the terminals 4 to the DPC. There are many different ways to connect terminal to DPC that are well understood in the art.

Figure 5:
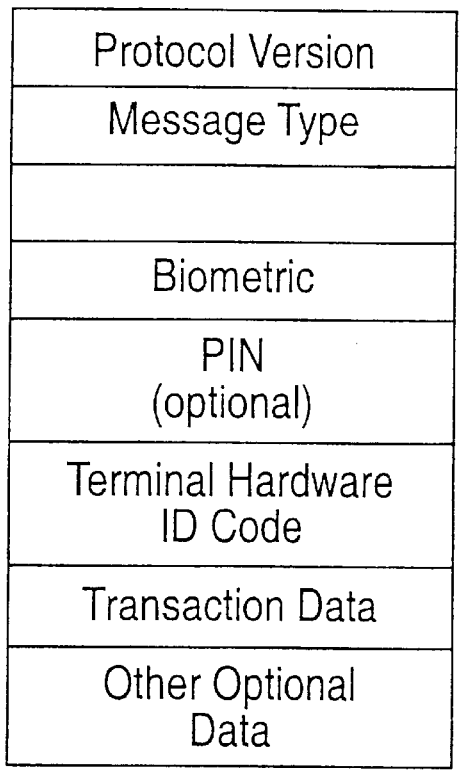
FIGS. 5 and 6 show preferred embodiments of Transaction Request and Transaction Response Messages.
Figure 6:
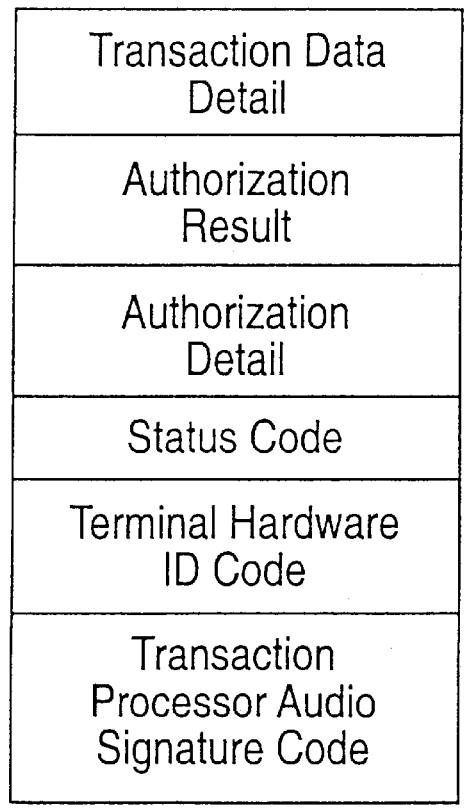

Terminals 4 communicate with the DPC through Transaction Request Messages 19 and Transaction Response Messages 20. A preferred embodiment of the Transaction Request and Transaction Response Messages is shown in FIGS. 5 and 6.

Data Processing Center

Data Processing Centers (DPC) primarily serve to identify the user and the transaction processor in an electronic transaction, retrieve credit/debit or other financial account information for identified parties, and performs the execution that will result in settlement of transactions and funds delivery for an electronic transaction. The identity of the user in an electronic transaction is determined using a comparator engine 30 which compares a bid biometric sample against registered biometric samples of users.

As seen in FIG. 1, in a preferred embodiment of the invention the DPC 8 is connected via communication network 22, such as the Internet or intranet using a firewall machine 26 that filters out all messages that are not from legitimate terminal devices.

Execution Module (EM)

Once the user chooses to execute a financial transaction, the terminal transmits the account and financial transaction detail, and a transaction processor entity identification code to the DPC. The EM determines the identity of the transaction processor entity by extracting the transaction processor entity identification code from the transaction request message. The instructions of the financial transaction, say debit transaction through an automated teller machine, or credit of an account is executed. The transaction processor entity either rejects or accepts the financial transaction and transmits that denial or acceptance back to the DPC. In turn, the EM of the DPC transmits that the acceptance or denial of the financial transaction processor entity to the terminal through a transaction response message. Through the same transaction response message or optionally another transaction response message, the EM transmits the transaction processor audio signature code to the terminal 4. The audio signature code is then matched against the registered audio signature codes residing on memory device 12. If a match occurs the terminal 4 triggers the play back of the audio signature of the transaction processor entity that conducted the financial transaction. For credit transactions, the EM obtains an authorization from the transaction processor, drawing down against the credit limit of the account but not resulting in a transfer of funds until settlement occurs. Settlement is defined as a resolution of a crediting or debiting instruction. For debit transactions, the EM transmits a debit instruction to a transaction processor, resulting in an immediate debit from the user's debit account. In either case, if insufficient resources are present in the user's account, the transaction is denied. Preferably, each transaction (successful or not) is logged in a logging facility.

The execution module 28 generates a message to an appropriate transaction processor depending on the type of the credit/debit account selected by the user. For credit accounts, the EM transmits the user credit account number, the transaction amount, and the payee transaction data to the credit transaction processor network. This information is forwarded to the transaction processor entity, which then either approves or denies the credit transaction.

If the transaction processor entity approves the credit transaction, it returns an authorization to the execution module, and restricts the credit limit of the user's account by the amount of the authorization. The EM 28 then transmits the credit authorization number received from the transaction processor back to the terminal, which stores the authorization prior to settlement. At the end of the day, or whenever the payee demands, the terminal transmits all stored authorizations to the credit network acquiring processor for settlement, whereupon the user's account is debited, and the payee's account is credited.

In another embodiment, the transaction processor entity is also the payee, such as is the case with a user using a Macy's credit account to purchase merchandise at a Macy's store. In this embodiment, the transaction processor entity approves the transaction and decreases available credit, but settlement is not required.

For debit accounts, the EM transmits the user debit account number, the transaction amount, and the payee transaction data to an on-line debit network. This information is forwarded to the transaction processor entity bank of the user, where the transaction is either approved or denied.

If the transaction processor entity bank approves the debit transaction, it preferably returns a transaction number, which aids in standard maintenance and bookkeeping record of transactions, to the EM, and immediately debits the user's debit account. The transaction number is returned to the terminal, which lists the transaction on a daily debit transaction summary. The payee need take no further action since debit transactions are automatically settled, at which point the payee's financial account is credited. In ATM banking transactions, execution module 28 optionally debits or credits the user's financial account.

For rewards transactions, the execution module 28 generates a message to a rule module to cause the rewards transaction to be settled. In one embodiment, upon successful identification of a rewards issuer transaction processor by the computer system, the EM invokes a rule module in a particular rewards transaction. In one embodiment, a recipient electronic registry which preferably contains at least one rewards account, a transaction processor entity rule registry, and a transaction processor entity electronic registry databases are within the DPC 8. In another embodiment, the DPC communicates with at least one external computer system containing any one of the recipient electronic registry, the transaction processor entity rule registry or the transaction processor entity electronic registry.

Once the rewards account of a user is located and the applicable rule module is invoked, the reward-units are credited to the rewards account or debited from the rewards account depending upon the criteria specified in the rule module pertinent to the particular transaction. In the event there is insufficient reward-units in the rewards account for a rewards debiting transaction to be settled, the transaction is "declined".

Registration

User and transaction processors that wish to conduct an electronic transactions must first register with the tokenless authorization system. A user must register at least one biometric or a biometric-PIN. Transaction processors register at least one transaction processor audio signature that is associated with an audio signature code of the transaction processor, and preferably at least one terminal or hardware identification code. The terminal or hardware identification code uniquely identifies the terminal to the DPC. The users must also register the appropriate electronic account information, such as a checking, a rewards, or a credit card account, for crediting and debiting of their electronic accounts.

To register, a user submits a registration biometric sample obtained from their physical person by the terminal's biometric sensor. The terminal then translates and compresses that biometric sample scan into a format suitable for rapid transmission to the DPC. Optionally, the user then enters a PIN code into the terminal keypad for enhanced security or increased speed of biometric identification.

Next, the user associates at least one electronic account number with the registration biometric sample in the system. Preferably, this is accomplished by scanning a magnetic stripe card provided by the person through the magnetic stripe card reader attached to the terminal.

The terminal transmits the registration data to the DPC 8. The DPC then inserts the biometric (or biometric-PIN) into the appropriate biometric identification database, and enables the user to originate electronic transactions.

Transaction processor audio signature codes are unique numbers or codes assigned to the transaction processors audio signatures. In an embodiment, when an electronic transaction is completed, the audio signature code is transmitted from the DPC to the terminal. The terminal contains a data bank of audio signatures 12, where each audio signature code is associated with an audio signature. When an audio signature code is received by the terminal, the audio signature that is associated with the audio signature code is played back to the user.

In an alternative embodiment of the identification computer system, during user registration, the user registers at least one user debit/credit account and assigns an account index code to each user credit/debit account. During the identification process, when submitting a bid biometric sample, the user adds the account index code to the Transaction Request Message 19. The account index code will automatically choose the pre-designated electronic account for the electronic transaction. The account index code preferably comprises of one or more alphanumeric characters.

Transaction Request Message

FIG. 5 shows an embodiment of a Transaction Request Message. A transaction request message originates from the terminal and contains information and data that is required for the processing of an electronic transaction. Primarily, these data includes a bid biometric sample taken from an individual user, and the instructions for debiting or credit an electronic account.

Transaction Response Message

FIG. 6 shows an embodiment of a Transaction Response Message. A transaction request message originates from the DPC and contains information and data that confirms the success or failure of a requested electronic transaction, as well as information that identifies the identity of the transaction processor. Typically, this includes a transaction processor entity code if the transaction processor audio signature is already stored on memory unit 12, or a transaction processor audio signature, if a new transaction processor audio signature is to be stored on memory unit 12, and played back to the user.

Registered Audio Signature

An audio signature is a series of notes, such as a MIDI sequence, or a sample audio waveform, such as a 44.1 kHz 16-bit stereo audio stream. Each audio signature is associated with a transaction processor through an audio signature code. The identification computer system uses audio signatures to identify a transaction processor party to the user.

Retail Point of Sale Financial Transactions

In a preferred embodiment, a party at the point of sale originates an electronic transaction in the following manner. First, the user submits a bid biometric sample obtained from their physical person by the terminal's biometric sensor. The terminal transmits the bid biometric to the DPC for identification of the user. The DPC identifies the user by comparing the bid biometric sample to the registered biometric samples. Upon successful identification of the user, the DPC retrieves the list of credit/debit accounts that the user has previously registered with the system, and transmits this list back to the user. As the account is operated by at least one transaction processor such as a bank, which is identified to and registered with the DPC, the audio signature code for that transaction processor is retrieved without the need for a transmission of an audio signature code from the terminal. Using the hardware identification code, the DPC determines whether the audio signature of the transaction processor resides on the terminals memory unit 12. If not, the DPC retrieves the registered audio signature for the transaction processor together with the audio signature code for that transaction processor and transmits them back to the terminal. If several transaction processors were involved in the transaction, then the audio signature of all transaction processors are played back to the user.

The terminal displays the list of credit/debit accounts to the user, who then selects one of the credit/debit accounts from which the funds will be drawn. In the event that only one credit/debit account was registered, that account will be automatically selected by the tokenless authorization system.

The transaction amount is then entered into the terminal, either using an electronic cash register or manually, by a payee. The user then either approves or cancels the transaction using the terminal's keypad. Once the electronic payment is approved, the terminal transmits the electronic payment to the DPC, where the DPC authorizes the transaction and transmits a transaction to the appropriate credit or debit network for the transaction amount.

In another embodiment, instead of the DPC transmitting the list of possible credit/debit accounts back to the terminal for user selection, the user instead indicates which account to select by entering an account index code or letter. This code is selected by the user during account registration and linked to a particular credit/debit account of the user.

Once the electronic transaction is complete, the DPC retrieves the audio signature code of the account operator transaction processor. The audio signature code is then transmitted via a Transaction Response Message 20 to the user. The terminal identifies the audio signature that is associated with the transmitted audio signature code in the audio signature data bank, and played backs the audio signature to the user. Thus, the computer system identifies the party that conducted the transaction to the user.

Audio Signature Data Bank

An audio signature data bank is a database that contains at least two audio signatures. Preferably, each audio signature is associated with at least one transaction processor entity. The audio signature databank is stored in the identification computer system's main memory, in a separate flash memory unit, or a file stored in the device's file system. Alternatively, audio signatures reside on a terminal's memory device 12, or are loaded from a network or an attached peripheral devices, such as hard disks, smart cards, PCMCIA cards, all of which are well known in the industry.

Sound Generator

The identification computer system uses a sound generator to playback the sound signature to the user. A sound generator includes a square wave generator with frequency control, a sine wave generator with frequency control, a music synthesis chip such as those found on Sound Blaster cards for personal computers, or a digital to analog converter. The sound wave generated by the sound generator is called a playback audio signature which is in the form of a tone, a musical fragment, speech, phonation, or a song. In a preferred embodiment, the device has control over the volume of the sound produced by the sound generator, and the sound generator is able to generate complex sounds containing multiple notes.

The sound generator may optionally include an amplifier. These and other sound reproduction methods are well known in the industry.

Transducer

The identification computer system also uses one or more transducers for playback the audio signatures. The sound generator produces an analog or digital signal which is then converted into sound or audio waves by the transducer. Examples of transducers include a conventional speaker, a piezoelectric buzzer or transducer, or a magnetic transducer.

To playback an audio signature to a user, the identification computer system identifies the audio signature associated with the transaction processor in the audio signature data bank through a transmitted audio signature code and transmits the audio signature to the terminal or biometric input apparatus. The sound generator in the terminal or biometric input apparatus converts the registered audio signature to an analog signal, which is converted into a playback audio signatures by the transducer.

The audio signature may be in the form of an audible voice announcing the actual name of the institution being identified, or may be a tonal sequence which is a representation of the identity of the institution. Such audible tones will serve to identify the transaction processor that was involved in any series of electronic transactions to the user. For example, if transaction processor A is used for conducting a financial transaction and transaction processor B is used to conduct a rewards transaction, the identification computer system preferably notifies the user of the identity audio signature of transaction processor A when the financial transaction process is complete, and the audio signature identity of transaction processor B when the rewards transaction is complete. Alternatively, the tokenless biometric identification system played backs the audio identity audio signatures when the user chooses a particular transaction processor to initiate an electronic transaction.

From the foregoing, it will be appreciated how the objectives and features of the invention are met. First, the invention provides an electronic payment computer system that provides for identification of a transaction processor using an audio signature play back to the user.

Second, the invention provides an electronic payment computer system that is capable of verifying a user's unique personal identity, as opposed to verifying possession of personalized objects and information.

Third, the invention verifies the user's identity based upon one or more unique characteristics physically personal to the user.

Fourth, the invention provides a system of secured access to a computer system that is highly resistant to fraudulent transaction authorization attempts by unauthorized users.

Although the invention has been described with respect to a particular tokenless authorization system that identifies a transaction processor to the user through the audio playback of that transaction processor's audio signature, and method for its use, it will be appreciated that various modifications of the apparatus and method are possible without departing from the invention, which is defined by the claims set forth below.

What is claimed is:

1. A tokenless biometric identification computer system, comprising:
   a) at least one database containing registered biometric samples of users;
   b) a comparator for comparing a bid biometric sample of a user to at least one registered biometric sample, the bid biometric sample obtained directly from the user during an identification process for conducting an electronic transaction by the user;
   c) a stored audio signature, wherein the stored audio signature is associated with a transaction processor entity, the transaction processor entity conducting the electronic transaction;
   d) a sound generator for generating an analog or digital signal from the stored audio signature; and
   e) a transducer for converting the analog or digital signal to a play back audio signature,
   f) wherein the play back audio signature is generated from the stored audio signature that is associated with the transaction processor entity and the play back audio signature is played back to the user to identify the transaction processor entity that conducted the electronic transaction,
   wherein two or more stored audio signatures are associated with a transaction processor entity.

2. The identification computer system of claim 1 further comprising at least two transaction processor entities.

3. The identification computer system of claim 1 wherein the play back audio signature is in the form of an audio sound wave comprising one or more of the group of a tone, a musical fragment, speech, phonation, or a song.

4. A tokenless biometric identification computer system, comprising:
   a) at least one database containing registered biometric samples of users;
   b) a comparator for comparing a bid biometric sample of a user to at least one registered biometric sample, the bid biometric sample obtained directly from the user during an identification process for conducting an electronic transaction by the user;
   c) a stored audio signature, wherein the stored audio signature is associated with a transaction processor entity, the transaction processor entity conducting the electronic transaction;
   d) a sound generator for generating an analog or digital signal from the stored audio signature; and
   e) a transducer for converting the analog or digital signal to a play back audio signature,
   f) wherein the play back audio signature is generated from the stored audio signature that is associated with the transaction processor entity and the play back audio signature is played back to the user to identify the transaction processor entity that conducted the electronic transaction,
   further comprising a stored audio signature data bank, wherein the audio signature databank contains at least two stored audio signatures, each audio signature associated with a transaction processor entity.

5. The identification computer system of claim 4 wherein the play back audio signature is in the form of an audio sound wave comprising one or more of the group of a tone, a musical fragment, speech, phonation, or a song.

6. A tokenless biometric identification computer system, comprising:
   a) at least one database containing registered biometric samples of users;
   b) a comparator for comparing a bid biometric sample of a user to at least one registered biometric sample, the bid biometric sample obtained directly from the user during an identification process for conducting an electronic transaction by the user;
   c) a stored audio signature, wherein the stored audio signature is associated with a transaction processor entity, the transaction processor entity conducting the electronic transaction;
   d) a sound generator for generating an analog or digital signal from the stored audio signature; and
   e) a transducer for converting the analog or digital signal to a play back audio signature,
   f) wherein the play back audio signature is generated from the stored audio signature that is associated with the transaction processor entity and the play back audio signature is played back to the user to identify the transaction processor entity that conducted the electronic transaction,
   wherein at least two transaction processors are identified to the user of the computer system by playing back the audio signature associated with each transaction processor entity.

7. The identification computer system of claim 6 wherein the play back audio signature is in the form of an audio sound wave comprising one or more of the group of a tone, a musical fragment, speech, phonation, or a song.

8. A method of identification of a transaction processor entity to a user of a tokenless biometric identification computer system, comprising the steps of:
   a) obtaining a bid biometric sample from the user's person and comparing the bid biometric sample to registered biometric samples to produce a successful or failed identification of the user;
   b) registering a stored audio signature associated with a transaction processor entity with the identification computer system;
   c) generating an analog or digital signal from the stored audio signature; and
   d) converting the analog or digital signal to a play back audio signature;
   e) wherein the play back audio signature converted from the audio signature associated with the transaction processor entity is played back to the user to identify the transaction processor that conducted the electronic transaction,
   wherein two or more stored audio signatures are associated with a transaction processor entity.

9. The method of claim 8 further comprising at least two transaction processor entities.

10. The method of claim 8 wherein the play back audio signature is in the form of an audio sound wave comprising one or more of the group of a tone, a musical fragment, speech, phonation, or a song.

11. A method of identification of a transaction processor entity to a user of a tokenless biometric identification computer system, comprising the steps of:
   a) obtaining a bid biometric sample from the user's person and comparing the bid biometric sample to registered biometric samples to produce a successful or failed identification of the user;
   b) registering a stored audio signature associated with a transaction processor entity with the identification computer system;

c) generating an analog or digital signal from the stored audio signature; and d) converting the analog or digital signal to a play back audio signature;

e) wherein the play back audio signature converted from the audio signature associated with the transaction processor entity is played back to the user to identify the transaction processor that conducted the electronic transaction, further comprising an audio data bank containing at least two audio signatures, each audio signature associated with a different transaction processor entity.

12. The method of claim 11 wherein the play back audio signature is in the form of an audio sound wave comprising one or more of the group of a tone, a musical fragment, speech, phonation, or a song.

13. A method of identification of a transaction processor entity to a user of a tokenless biometric identification computer system, comprising the steps of:

a) obtaining a bid biometric sample from the user's person and comparing the bid biometric sample to registered biometric samples to produce a successful or failed identification of the user;

b) registering a stored audio signature associated with a transaction processor entity with the identification computer system;

c) generating an analog or digital signal from the stored audio signature; and d) converting the analog or digital signal to a play back audio signature;

e) wherein the play back audio signature converted from the audio signature associated with the transaction processor entity is played back to the user to identify the transaction processor that conducted the electronic transaction, further comprising a stored audio signature data bank, wherein the audio signature databank contains at least two stored audio signatures, each audio signature associated with a transaction processor entity.

14. The method of claim 13 wherein the play back audio signature is in the form of an audio sound wave comprising one or more of the group of a tone, a musical fragment, speech, phonation, or a song.

15. A method of identification of a transaction processor entity to a user of a tokenless biometric identification computer system, comprising the steps of:

a) obtaining a bid biometric sample from the user's person and comparing the bid biometric sample to registered biometric samples to produce a successful or failed identification of the user;

b) registering a stored audio signature associated with a transaction processor entity with the identification computer system;

c) generating an analog or digital signal from the stored audio signature; and d) converting the analog or digital signal to a play back audio signature;

e) wherein the play back audio signature converted from the audio signature associated with the transaction processor entity is played back to the user to identify the transaction processor that conducted the electronic transaction, wherein at least two transaction processors are identified to the user of the computer system by playing back the audio signature associated with each transaction processor entity.

16. The method of claim 15 wherein the play back audio signature is in the form of an audio sound wave comprising one or more of the group of a tone, a musical fragment, speech, phonation, or a song.

* * * * *